(12) United States Patent
Barry

(10) Patent No.: US 7,858,685 B2
(45) Date of Patent: Dec. 28, 2010

(54) SOLVENT-BASED SURFACE COATING

(75) Inventor: Robert Barry, Chicago, IL (US)

(73) Assignee: Robert L. Barry, Chicago, IL (US)

( * ) Notice: Subject to any disclaimer, the term of this patent is extended or adjusted under 35 U.S.C. 154(b) by 0 days.

(21) Appl. No.: 12/454,665

(22) Filed: May 21, 2009

(65) Prior Publication Data

US 2010/0298479 A1 Nov. 25, 2010

(51) Int. Cl.
*C08K 3/26* (2006.01)
*C09D 11/02* (2006.01)

(52) U.S. Cl. ...................... 524/425; 524/270

(58) Field of Classification Search ............. 524/425
See application file for complete search history.

(56) References Cited

U.S. PATENT DOCUMENTS

| 5,324,768 | A | 6/1994 | Walmsley |
| 5,730,791 | A | 3/1998 | Krogh et al. |
| 6,306,943 | B1 * | 10/2001 | Henry ..................... 524/270 |
| 6,689,734 | B2 | 2/2004 | Doyel et al. |
| 2006/0251694 | A1 | 11/2006 | Nielsen et al. |
| 2007/0215004 | A1 | 9/2007 | Kuroda et al. |
| 2009/0193743 | A1 * | 8/2009 | Wiercinski ................ 52/408 |

* cited by examiner

*Primary Examiner*—David Wu
*Assistant Examiner*—Hui Chin

(57) ABSTRACT

The present invention provides environmentally acceptable solvent-based surface coatings that are particularly useful as pigmented polymeric roof-coatings, sealants, caulks, and the like. A solvent-based surface coating composition of the invention comprises an n-propyl bromide-containing solvent with a polymeric coating resin dispersed therein. In a preferred embodiment, the composition comprises a solvent containing n-propyl-bromide and a liquid hydrocarbon, with a filler (e.g., a pigment) and a polymeric coating resin dispersed therein.

18 Claims, No Drawings

SOLVENT-BASED SURFACE COATING

FIELD OF THE INVENTION

This invention relates to protective solvent-based coatings and sealants. More particularly, this invention relates to solvent-based surface coatings and sealants comprising n-propyl bromide.

BACKGROUND OF THE INVENTION

Solvent-based polymeric surface coating and sealant compositions are utilized in a variety of industries, including automobile manufacture, marine coatings for ships, boats, and bridges, industrial and commercial floor coatings, roof coatings, and the like. The roofing industry, in particular, utilizes a variety of solvent-based polymeric coatings, due to the need for high levels of water resistance. Currently, there is a push, particularly in urban areas, to increase the diffuse reflectivity (albedo) of roofs, since increased albedo helps to reduce the so-called "urban heat island phenomenon" common to modern cities. The dark color of common roofing materials, in combination with dark-colored asphalt streets, results in absorption of enormous amounts of solar energy in concentrated urban settings, which manifests itself as heat. This can significantly increase the temperature in a city compared to the surrounding suburban areas, which generally have innate cooling mechanisms, such as water evaporation from vegetation, that mitigate solar heating.

Many municipalities are now encouraging or even requiring application of high-albedo, generally white colored, roof coatings over asphalt or ethylene propylene diene monomer (EPDM) roofs to reduce urban overheating. The major types of white roof coatings in current use are water-based acrylic coatings and hydrocarbon solvent-based, pigmented synthetic elastomer coatings, usually containing a styrene ethylene/propylene styrene block polymer and an adhesive resin for the necessary level of water resistance and pigment adhesion or binding. Water-based coatings are of limited usefulness in some climates because of their susceptibility to rainfall, freezing and high humidity. They also exhibit poor adhesion to some common roofing materials including TPO (thermoplastic polyolefin), EPDM, and asphalt roofs. One significant drawback of such coatings is that they typically cannot be applied directly on an asphalt or EPDM surface. In the case of asphalt, various colored components leach out of the asphalt and into the white coating layer, thus reducing the heat-reflective nature of the coating. With EPDM roofs, these solvent-based coatings cause undesirable levels of swelling and wrinkling when applied directly to the EPDM rubber surface. To avoid these problems, a primer must be applied to the asphalt or the EPDM roof prior to application of the high-albedo coating.

In addition, the hydrocarbon solvents used in the commercial coating compositions (aliphatic hydrocarbons, aromatic hydrocarbons, or mixtures thereof) desirably has a flash point of about 25-38° C., preferably 37-38° C., to reduce the potential fire hazards associated with hydrocarbon solvents. Unfortunately, the drying time of hydrocarbon solvents is inversely related to the flash point. Fast drying times are desirable for efficiency of the workers and to minimize the adhesion of soil, leaves, or other air-born debris to the surface of the roof coating. There is a desire in the industry for faster drying times for solvent-based roof coatings, which cannot be achieved with hydrocarbons alone, due to the fire hazards of the necessary lower flash point solvents, and the higher environmental impact of such solvents.

Accordingly, there is an ongoing need for environmentally acceptable, pigmented, polymer-containing, solvent-based surface coatings, particularly for roof-coatings, with improved properties such as faster drying times, and the ability to be applied without a primer. The present invention fulfills this need.

SUMMARY OF THE INVENTION

The present invention provides environmentally acceptable solvent-based surface coatings that are particularly useful, for example, as pigmented polymeric roof-coatings, sealants, and caulks. A solvent-based surface coating composition of the invention comprises a polymeric coating resin, and optionally, a filler (e.g., a pigment), dispersed a solvent containing n-propyl-bromide. Preferably, the composition comprises about 5 to about 60 percent by weight (wt. %) of the polymer and about 10 to about 80 wt. % solvent, on a total composition weight basis.

In one preferred embodiment, the composition of the invention comprises about 5 to about 60 wt. % of a polymeric resin and about 2 to about 50 wt % of a filler dispersed in about 10 to about 80 wt. % of a solvent, on a total composition weight basis. The solvent in this embodiment comprises about 5 to about 60 wt. % n-propyl bromide, and about 5 to about 40 wt. % of a liquid aliphatic hydrocarbon, on a total solvent weight basis.

In another preferred embodiment, the composition of the invention comprises about 5 to about 60 wt. % of an elastomeric polymer and about 2 to about 50 wt. % of a filler dispersed in about 10 to about 80 wt. % of a solvent, on a total composition weight basis. In this embodiment, the solvent also comprises about 5 to about 60 wt. % n-propyl bromide, about 5 to about 40 wt. % of a liquid aliphatic hydrocarbon, and optionally up to about 25 wt. % of a liquid aromatic hydrocarbon (e.g., about 0.1 to about 25 wt. %, on a total solvent weight basis.

A preferred elastomeric polymer useful in the coating compositions of the present invention is a styrene-ethylene/butylene-styrene (SEBS) block polymer. Optionally, the compositions of the invention can include one or more functional additives, such as a dispersant e.g., to aid in suspension and solvation of the filler/pigment, an antioxidant, a light stabilizer, a surfactant, an additional hydrocarbon-based resin, and the like.

The compositions of the present invention can contain any filler that is suitable for use in surface coatings, many of which are well known in the art. Preferred fillers are inorganic pigments (e.g., natural or synthetic minerals). White pigments are particularly preferred for high-albedo roof coating applications.

The compositions of the invention beneficially provide environmentally acceptable, polymeric surface coatings, which are particularly useful as roof-coatings, sealants, and caulks. The compositions of the present invention also exhibit certain surprising and unexpected advantages such as significantly reduced migration of asphalt components to the surface of the polymeric coating when coated directly over asphalt, without a separate primer, and a significant reduction or elimination of EPDM wrinkling and swelling when coated directly over EPDM materials, without a separate primer.

DETAILED DESCRIPTION OF PREFERRED EMBODIMENTS

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods of manufacturing or preparing the compositions of the invention described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, the term "filler" refers to an insoluble solid particulate or fibrous material dispersed in the coating material, generally to improve a property of the coating, such as the color, the strength, surface roughness, and the like. Suitable fillers include inorganic (e.g., mineral) or organic (e.g., cellulose-based materials, hydrocarbon polymers such as polyethylene, and the like) materials, as are well known in the art. In some preferred embodiments, the filler (preferably an inorganic mineral material) is present in the composition at a concentration in the range of about 2 to about 50 wt. % on a total composition weight basis. Fillers can be particulate materials or fibrous materials.

For roof coating applications, preferred fillers are inorganic particulate materials, such as inorganic pigments. White pigments are particularly preferred for high-albedo roof coating compositions. Non-limiting examples of preferred white pigments include calcium carbonate, titanium dioxide (titania), silicon dioxide (silica), aluminum oxide (alumina), aluminum hydroxide, cerium oxide (ceria), zirconium oxide (zirconia), zinc oxide, clays (e.g., attapulgite clay), and the like, as well as mixtures of two or more of the forgoing. Particularly preferred white pigments include calcium carbonate, titanium dioxide, attapulgite clay, and mixtures of two or more thereof. A particularly preferred white filler comprises a mixture of calcium carbonate, titanium dioxide and a clay, e.g., a hydrous magnesium-aluminum silicate such as attapulgite (also known as polygorskite). For sealant compositions, a fibrous filler, such as a polyethylene minifiber material (2 mm to 25 mm fiber length), is preferably included in the composition, in addition to an inorganic filler such as titanium dioxide, calcium carbonate, clays, and the like, to increase the viscosity and provide enhanced mechanical strength. Non-limiting examples of suitable polyethylene minifiber materials (also known as polyethylene pulp) include SHORT STUFF® polyethylene minifibers, available from MiniFibers, Inc., Johnson City, Tenn.

Polymeric resin materials useful in coatings are well known in the art. The compositions of the present invention can include any polymer useful as a surface coating material (e.g., alkyds, epoxies, polyurethanes, acrylics, vinyls, hydrocarbon resins, rubbers, and the like). In the context of roof coatings, sealants, caulks, and the like, preferred polymeric resins include, without limitation, elastomeric polymers, such as thermoplastic rubbers (natural and synthetic, such as styrene butadiene, polybutadiene, ethylene propylene, acrylonitrile butadiene, polyisoprene, etc.), thermoplastic hydrocarbon resins (e.g., thermoplastic alpha-methyl styrene polymers, hydrogenated hydrocarbon resins, etc.), and the like.

A particularly preferred elastomeric polymer is a synthetic thermoplastic rubber such a styrene block copolymer (e.g., a styrene-ethylene/butylene-styrene (SEBS) block polymer). SEBS polymers include a polystyrene block flanking both ends of an ethylene/butylene copolymeric block. Suitable styrene block copolymers, such as SEBS block polymers, are well known in the art, and are available commercially from a variety of sources, such as the KRATON® polymers SEBS G Series products, (e.g., KRATON® 1652, KRATON® 1726, and the like), available from Kraton Polymers LLC of Houston, Tex.

The polymeric resin material (e.g., SEBS) preferably is present in the coating compositions of the present invention at a concentration in the range of about 5 to about 60 wt. % (e.g., about 8 to about 30 wt. %).

In some preferred embodiments, the compositions includes a hydrogenated hydrocarbon resin, useful for adhesion, in addition to an elastomeric polymer such as SEBS. Preferably, the hydrogenated hydrocarbon resin is present in the composition at a concentration in the range of about 6 to 20 wt. % on a total composition weight basis. Examples of suitable hydrocarbon resins include, without limitation, the REGALREZ® series resins (e.g., REGALREZ® 1094, 3102, and the like) available from Eastman Chemical Co., Kingsport, Tenn.

A key ingredient of the compositions of the present invention is an organic solvent that contains n-propyl bromide (1-bromopropane, or "NPB"). Preferably, the composition comprises about 10 to about 80 wt. % solvent, on a total composition weight basis (e.g., about 25 to about 60 wt. %). In some preferred embodiments, the solvent comprises about 5 to about 60 wt. % NPB (e.g., about 10 to about 25 wt. %). A preferred solvent includes about 5 to about 60 wt. % NPB in combination with about 5 to about 40 wt. % (e.g., about 10 to about 30 wt. %) of a liquid hydrocarbon material, such as a liquid aliphatic hydrocarbon. Optionally, the solvent can include up to about 25 wt. % liquid aromatic hydrocarbon (e.g., about 0.1 to about 25 wt. %, or about 3 to about 20 wt. %).

The liquid hydrocarbon, when utilized, can be a single hydrocarbon material or preferably, a mixture of hydrocarbons. Preferred aliphatic hydrocarbon solvents include mineral spirits (also known as Napthol Spirits, Stoddard Solvent or white spirit), and the like. Mineral spirits are generally colorless mixtures of $C_7$ to $C_{12}$ hydrocarbons, typically sold commercially on the basis of a flash point i.e., low (e.g., 21-30° C.), regular (e.g., 31-54° C.), or high (e.g., 55° C. or greater) flash point, or based on a boiling point range. For safety, environmental, and/or performance reasons (e.g., drying time), preferred liquid hydrocarbons have a flash point of at least about 37° C. (e.g., about 37 to about 40° C.).

Liquid aromatic hydrocarbons, when present, also preferably have a flash point of about at least about 25° C. (e.g., about 25-40° C.). Such liquid aromatic hydrocarbons typically comprise mixtures of alkyl-substituted phenyl compounds, such as toluene (monomethyl substituted), xylenes (dimethyl substituted), cumene (isopropyl substituted), pseudocumene (1,2,4 trimethyl substituted), and the like. In some preferred embodiments, the liquid aromatic solvent comprises, consists essentially of, or consists of xylenes (flash point of about 27° C.).

In addition, the compositions of the present invention can include one or more functional additive or stabilizer materials such as an antioxidant (e.g., butylated hydroxy toluene, etc.), a light stabilizer (e.g., an aromatic, heterocyclic, or heteroaromatic material such as TINUVIN® brand stabilizers available from BASF, Ludwigshafen, Germany, etc.), a surfactant (e.g., an anionic surfactant such as a fatty alcohol sulfonate or a fatty acid salt, a cationic surfactant such as 3-(isodecyloxy)-1-propanamine acetate, or non-ionic surfactant such as a polyethylene glycol, etc.), a plasticizer, a dispersant such as an anionic or cationic polymer, a preservative (e.g., a biocide such as an isothiazolinone, an iodinated hydrocarbon, an aromatic alcohol, etc.), and the like, in quantities sufficient to achieve their desired effect on the properties of the composition. Functional additive and stabilizer materials are well known in the surface coating arts. The choice of which functional additives to include, if any, will depend upon the overall properties desired for a given composition. The concentrations of any included functional additives are selected to be sufficient to provide the desired effect on the property of interest. The selection of a functional additive and the concentration of any such additive is generally within the level of ordinary skill in the surface coating formulation arts.

Table 1 provides some typical, non-limiting formulations for compositions of the present invention useful for roof coatings and sealing materials such as high-albedo (e.g., white) roof coatings, sealants, and caulks. In addition to the materials listed in Table 2, the compositions can also include one or more functional additives, as described above. The formulations shown in Table 1 include broad general wt. % ranges for listed ingredients, as well as narrower wt. % ranges. Any given composition encompassed by the general formulations in the table will include amounts of ingredients (including those listed and, optionally, other non-listed ingredients) in which the weight percentages add up to 100 percent.

TABLE 1

| Ingredient | Broad Range (Wt. %) | Pref. Range (Wt. %) |
|---|---|---|
| Total solvent* | 10-80% | 25-60% |
| n-Propyl bromide** | 5-60% | 10-25% |
| Aliphatic hydrocarbon solvent** | 0-40% | 10-30% |
| Aromatic hydrocarbon solvent** | 0-25% | 3-20% |
| Total polymer resin* | 10-60% | 15-60% |
| Elastomeric polymer (e.g., SEBS) | 5-60% | 8-30% |
| Hydrocarbon resin | 6-30% | 9-30% |
| Filler/Pigment* | 2-50% | 2-40% |
| TiO₂ | 2-30% | 2-10% |
| CaCO₃ | 0-30% | 10-30% |
| Clay | 0-20% | 0-10% |

*concentrations on a total composition weight basis
**concentrations on a total solvent weight basis

EXAMPLE 1

An exemplary roof coating composition of the present invention was prepared containing the ingredients listed in Table 2 and a total solids content of about 55.5% by weight. In preparing the composition, the ingredients were added to a mixing tank in the amounts shown in Table 2. After uniformly mixing the combined materials, the resulting white solvent-based roof coating composition was packaged in drums.

TABLE 2

| Ingredient | Weight (lbs.) | Volume (gal.) | Weight % |
|---|---|---|---|
| n-Propyl bromide | 495.44 | 44 | 19.3 |
| Mineral spirits (100 F.)# | 479.85 | 70 | 18.7 |
| Aromatic solvent (100 F.)# | 166.06 | 23 | 6.5 |
| Hyd. Hydrocarbon Resin## | 310 | | 12.1 |
| TiO₂ | 187.5 | | 7.3 |
| CaCO₃ | 600 | | 23.4 |
| SEBS | 280 | | 10.9 |
| Stabilizers | 44 | | 1.8 |

Reported Flash Point of about 100-105° F. (about 37-38° C.)
A hydrogenated hydrocarbon tackifying resin A portion of the prepared composition of Example 1 was used to directly coat a section of an asphalt roof, without a primer. The composition was applied to the asphalt using about a 1.9 cm (about 0.75 inch) diameter nap paint roller. The applied coating formed a skin within 15 minutes, and was dry within 2 hours. No significant discoloration due to asphalt leaching was observed upon drying.

In comparison, a commercial white SEBS solvent-based roof coating (e.g., TOPPS® SEAL liquid, sold by Topps Products, Inc., KS), which includes similar ingredients to the compositions of the invention, but which is free from n-propyl bromide, requires 30 to 120 minutes to form a skin and 4 to 24 hours to dry. The commercial coating typically shows significant areas of yellow discoloration when directly applied to an asphalt roof without a primer, due to leaching of asphalt components to the surface of the coating.

In another evaluation, the composition of Example 1 was coated over an EPDM synthetic rubber-coated section of roofing. No significant wrinkling or swelling was observed for the underlying EPDM membrane.

In comparison, a commercial n-propyl bromide-free white SEBS solvent-based roof coating (e.g., TOPPS® SEAL liquid, sold by Topps Products, Inc., Kans.) causes wrinkling and swelling of an underlying EPDM membrane in an unpredictable manner.

EXAMPLE 2

An exemplary sealant composition of the present invention was prepared containing the ingredients listed in Table 3, and a total solids content of about 53.1% by weight.

TABLE 3

| Ingredient | Weight (lbs.) | Volume (gal.) | Weight % |
|---|---|---|---|
| n-Propyl bromide | 56.3 | 5 | 12.5 |
| Mineral spirits (100 F.)# | 68.55 | 10 | 15.2 |
| Xylene | 86.64 | 12 | 19.2 |
| Hyd. Hydrocarbon Resin## | 50 | | 11.1 |
| TiO₂ | 25 | | 5.5 |
| Polyethylene Minifiber | 16 | | 3.5 |
| Attapulgite Clay | 50 | | 11.1 |
| SEBS | 88 | | 19.5 |
| Stabilizers | 10.6 | | 2.4 |

Reported Flash Point of about 100-105° F. (about 37-40° C.)
A hydrogenated hydrocarbon tackifying resin

EXAMPLE 3

An exemplary caulk composition of the present invention includes the ingredients listed in Table 3, with the exception of the polyethylene minifibers, and with a total solids content of about greater than about 60% by weight, e.g., 60-65% by weight.

The n-propyl bromide-containing, white-pigmented, SEBS surface-coating composition embodiments of the present invention provide numerous unexpected benefits over conventional pigmented, SEBS roof-coating compositions, including the following:

(a) can be coated directly on asphalt in two coats without significant discoloration, without a separate primer;

(b) greatly reduced swelling and reduced wrinkling when applied in two coats directly to an EPDM roof, without a separate primer;

(c) lower over-spray potential;

(d) lower flammability;

(e) faster drying time;

(f) faster skinning time, which reduces extraneous soil and leaf adhesion;

(g) reduced solvent odor;

(h) lower environmental impact vis-a-vis ozone and smog formation than products based solely on aliphatic and aromatic hydrocarbon solvents;

(i) higher specific gravity formulations possible, which improves moisture displacement and allows for coating on wet surfaces; and (j) improved resistance to rainfall damage, likely due to the faster drying and higher specific gravity.

Additionally, the ability to utilize the compositions of the invention without a separate primer provides advantages for sales and distribution, since fewer products need to be maintained in stock and transported to the work site.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A solvent-based surface coating composition comprising an elastomeric polymeric resin dispersed in a solvent comprising n-propyl bromide wherein the polymeric resin consists of a styrene-ethylene/butylene-styrene (SEBS) block polymer and is present in the composition at a concentration in the range of about 5 to about 60 percent by weight, and the solvent is present at a concentration in the range of about 10 to about 80 percent by weight, on a total composition weight basis and the composition includes about 2 to about 50, percent by weight of a filler, on a total composition weight basis.

2. The composition of claim 1 wherein the solvent comprises about 5 to about 60 percent by weight n-propyl bromide and about 5 to about 40 percent by weight of an liquid aliphatic hydrocarbon, on a total solvent weight basis.

3. The composition of claim 2 wherein the liquid aliphatic hydrocarbon has a flash point of at least about 37° C.

4. The composition of claim 2 wherein the solvent further comprises about 0.1 to about 25 percent by weight of a liquid aromatic hydrocarbon.

5. The composition of claim 4 wherein the liquid aromatic hydrocarbon comprises a xylene.

6. A solvent-based surface coating composition comprising about 2 to about 50 percent by weight of a filler and about 5 to about 60 percent by weight of an elastomeric polymeric resin dispersed in about 10 to about 80 percent by weight of a solvent containing about 5 to about 60 percent by weight n-propyl bromide, and about 5 to about 40 percent by weight of a liquid aliphatic hydrocarbon; wherein the polymeric resin consists of a styrene-ethylene/butylene-styrene (SEBS) block polymer.

7. The composition of claim 6 wherein the solvent further comprises about 0.1 to about 25 percent by weight of a liquid aromatic hydrocarbon.

8. The composition of claim 6 wherein the filler comprises at least one mineral selected from the group consisting of calcium carbonate, titanium dioxide (titania), silicon dioxide (silica), aluminum oxide (alumina), aluminum hydroxide, cerium oxide (ceria), zirconium oxide (zirconia), zinc oxide, and a clay.

9. The composition of claim 6 further comprising about 6 to about 20 percent by weight of a hydrogenated hydrocarbon resin.

10. A solvent-based surface coating composition comprising about 2 to about 50 percent by weight of a filler and about 5 to about 60 percent by weight of an elastomeric polymer dispersed in about 10 to about 80 percent by weight, on a total composition weight basis, of a solvent containing about 5 to about 60 percent by weight n-propyl bromide, about 5 to about 40 percent by weight of a liquid aliphatic hydrocarbon, and about 0.1 to about 25 percent by weight of a liquid aromatic hydrocarbon, on a total solvent weight basis; wherein the elastomeric polymer consists of a stvrene-ethylene/butylene-styrene (SEBS) block polymer.

11. The composition of claim 10 wherein the SEBS polymer is present in the combination at a concentration in the range of about 8 to about 30 percent by weight.

12. The composition of claim 10 wherein the liquid aliphatic hydrocarbon comprises mineral spirits.

13. The composition of claim 10 wherein the liquid aliphatic hydrocarbon has a flash point of at least about 37° C.

14. The composition of claim 10 wherein the solvent comprises about 3 to about 20 percent by weight of the liquid aromatic hydrocarbon.

15. The composition of claim 10 wherein the liquid aromatic hydrocarbon comprises a toluene, a xylene, a cumene, a pseudocumene, or a combination thereof.

16. The composition of claim 10 wherein the liquid aromatic hydrocarbon comprises a xylene.

17. The composition of claim 10 further comprising one or more materials selected from the group consisting of an antioxidant, a light stabilizer, a surfactant, and a dispersant.

18. The composition of claim 10 further comprising about 6 to about 30 percent by weight of a hydrogenated hydrocarbon resin.

* * * * *